US012243472B2

(12) United States Patent
Ma et al.

(10) Patent No.: US 12,243,472 B2
(45) Date of Patent: Mar. 4, 2025

(54) LIGHT-EMITTING DIODE PANEL AND DRIVING DEVICE THEREOF

(71) Applicant: Novatek Microelectronics Corp., Hsinchu (TW)

(72) Inventors: Yu-Sheng Ma, Taichung (TW); Jhih-Siou Cheng, New Taipei (TW); Chun-Fu Lin, Taoyuan (TW); Jin-Yi Lin, Kaohsiung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/365,247

(22) Filed: Aug. 4, 2023

(65) Prior Publication Data

US 2024/0046856 A1 Feb. 8, 2024

Related U.S. Application Data

(60) Provisional application No. 63/395,331, filed on Aug. 5, 2022.

(51) Int. Cl.
*G09G 3/32* (2016.01)

(52) U.S. Cl.
CPC ....... *G09G 3/32* (2013.01); *G09G 2310/0251* (2013.01); *G09G 2310/0267* (2013.01); *G09G 2310/0275* (2013.01); *G09G 2330/04* (2013.01)

(58) Field of Classification Search
None
See application file for complete search history.

(56) References Cited

U.S. PATENT DOCUMENTS

| | | | | |
|---|---|---|---|---|
| 11,132,942 | B2 | 9/2021 | Ko | |
| 2004/0223008 | A1* | 11/2004 | Ishizuka | G09G 3/3216 345/76 |
| 2007/0120777 | A1* | 5/2007 | Kim | G09G 3/3216 345/76 |
| 2021/0272509 | A1 | 9/2021 | Ko | |
| 2021/0375200 | A1 | 12/2021 | Lin et al. | |

FOREIGN PATENT DOCUMENTS

| | | |
|---|---|---|
| TW | 202036515 | 10/2020 |
| TW | 202135037 | 9/2021 |

OTHER PUBLICATIONS

"Office Action of Taiwan Counterpart Application", issued on Jul. 9, 2024, p. 1-p. 6.

* cited by examiner

*Primary Examiner* — Brian M Butcher
(74) *Attorney, Agent, or Firm* — JCIPRNET

(57) ABSTRACT

A light-emitting diode (LED) panel and a driving device therefore is provided. The driving device includes a source driver and a scan driver. The source driver is coupled to a plurality of data lines disposed in the LED panel. The source driver outputs driving currents to the data lines in any one of a plurality of scan line periods, to drive an LED array of the LED panel. The scan driver is coupled to a plurality of scan lines disposed in the LED panel, wherein the scan driver scans the scan lines during the plurality of scan line periods. In an active period of any one of the scan line periods, the scan driver applies an enable voltage to a current scan line among the scan lines, and the scan driver applies a pre-charge voltage to other scan line among the scan lines.

20 Claims, 8 Drawing Sheets

LIGHT-EMITTING DIODE PANEL AND DRIVING DEVICE THEREOF

CROSS-REFERENCE TO RELATED APPLICATION

This application claims the priority benefit of US provisional application Ser. No. 63/395,331, filed on Aug. 5, 2022. The entirety of the above-mentioned patent application is hereby incorporated by reference herein and made a part of this specification.

BACKGROUND

Technical Field

The disclosure relates to a display device, and in particular relates to a light-emitting panel and a driving device therefore.

Description of Related Art

Passive matrix (PM) light-emitting diode (LED) panels are widely used in various display devices. The driving method of the conventional PM LED panels may cause various erroneous driving problems such as afterimages (erroneous light-up). How to avoid erroneous driving is one of many technical issues in the field of PM LED panel technology.

SUMMARY

The disclosure provides a light-emitting diode (LED) panel and a driving device thereof to correctly drive the LED.

In an embodiment of the disclosure, the driving device includes a source driver and a scan driver. The source driver is coupled to multiple data lines disposed in the LED panel. The source driver is configured to output driving currents to the data lines in any one of multiple scan line periods, to drive an LED array of the LED panel. The scan driver is coupled to multiple scan lines disposed in the LED panel. The scan driver scans the scan lines during the scan line periods. In an active period of any one of the scan line periods, the scan driver applies an enable voltage to a current scan line among the scan lines, and the scan driver applies a pre-charge voltage to a first other scan line among the scan lines.

In an embodiment of the disclosure, the driving device includes a source driver and a scan driver. The source driver is coupled to multiple data lines disposed in the LED panel. The source driver is configured to output driving currents to the data lines in any one of multiple scan line periods, to drive an LED array of the LED panel. The scan driver is coupled to multiple scan lines disposed in the LED panel. The scan driver scans the scan lines during the scan line periods. In an active period of any one of the scan line periods, the scan driver applies an enable voltage to a current scan line among the scan lines, the scan driver applies a pre-charge voltage to a first other scan line that is not connected to any short-circuited LED, and the scan driver sets a second other scan line connected to a short-circuited LED as electrically floating.

In an embodiment of the disclosure, the LED panel includes an LED array, multiple data lines, and multiple scan lines. The data lines are used for coupling to a source driver. The source driver outputs driving currents to the data lines in any one of multiple scan line periods to drive the LED array. The scan lines are used for coupling to the scan driver. The scan driver scans the scan lines during the scan line periods. In an active period of any one of the scan line periods, the scan driver applies an enable voltage to a current scan line among the scan lines, and the scan driver applies a pre-charge voltage to a first other scan line among the scan lines.

In an embodiment of the disclosure, the LED panel includes an LED array, multiple data lines, and multiple scan lines. The data lines are used for coupling to the source driver. The source driver outputs driving currents to the data lines in any one of multiple scan line periods to drive an LED array. The scan lines are used for coupling to the scan driver. The scan driver scans the scan lines during the scan line periods. In an active period of any one of the scan line periods, the scan driver applies an enable voltage to a current scan line among the scan lines, the scan driver applies a pre-charge voltage to a first other scan line that is not connected to any short-circuited LED, and the scan driver sets a second other scan line connected to a short-circuited LED as electrically floating.

Based on the above, in an active period of any one of the scan line periods, the scan driver applies an enable voltage to a current scan line among the scan lines, and the scan driver applies a pre-charge voltage to a first other scan line among the scan lines. Based on this, the reverse bias voltage difference of the LED circuit connected to the first other scan line may be determined to be within a safe range, so as to avoid damage to the LED circuit connected to the first other scan line. In the case that the LED panel has a short-circuited LED, assuming that the short-circuited LED is connected to the second other scan line, the scan driver may set the second other scan line connected to the short-circuited LED to be electrically floating. Based on this, the driving current of the current scan line may be prevented from being shunted to the second other scan lines. Therefore, the driving device may correctly drive the LED panel.

In order to make the above-mentioned features and advantages of the disclosure comprehensible, embodiments accompanied with drawings are described in detail below.

DETAILED DESCRIPTION OF DISCLOSED EMBODIMENTS

Figure 1:
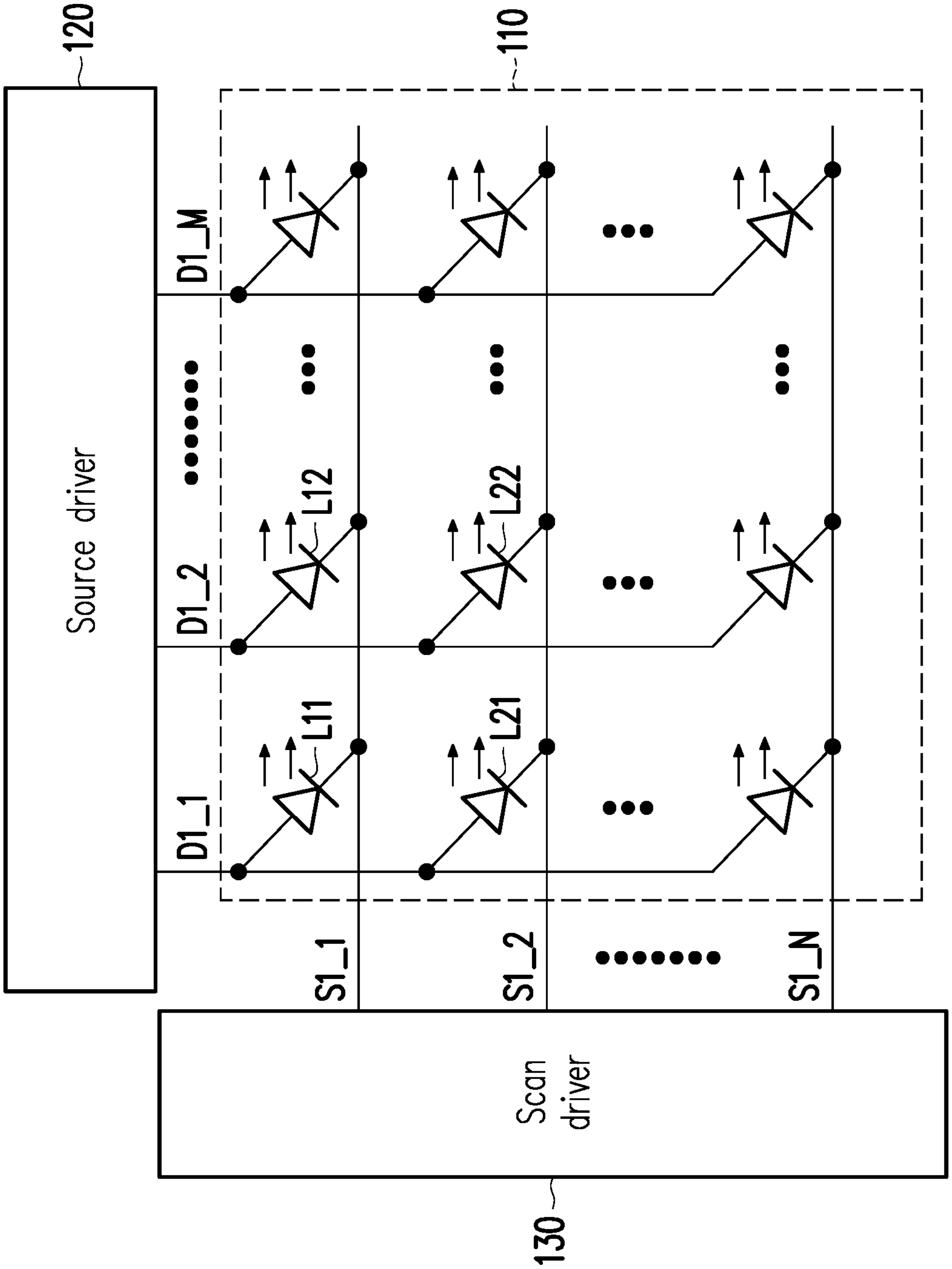
FIG. 1 is a schematic diagram of a circuit block of a display device according to an embodiment of the disclosure.

The term "coupled (or connected)" as used throughout this specification (including the scope of the application) may refer to any direct or indirect means of connection. For example, if it is described in the specification that a first device is coupled (or connected) to a second device, it should be construed that the first device may be directly connected to the second device, or the first device may be indirectly connected to the second device through another device or some type of connecting means. Terms "first," "second" and the like mentioned in the full text (including the scope of the patent application) of the description of this application are used only to name the elements or to distinguish different embodiments or scopes and are not intended to limit the upper or lower limit of the number of the elements, nor is it intended to limit the order of the elements. In addition, wherever possible, elements/components/steps with the same reference numerals in the drawings and embodiments represent the same or similar parts. Elements/components/steps that use the same reference numerals or use the same terminology in different embodiments may refer to relevant descriptions of each other.

FIG. 1 is a schematic diagram of a circuit block of a display device according to an embodiment of the disclosure. The display device shown in FIG. 1 includes a light-emitting diode (LED) panel 110 and a driving device, in which the driving device includes a source driver (or referred to as a data driver) 120 and a scan driver (or referred to as a gate driver) 130. Based on actual design, in some embodiments, the source driver 120 and the scan driver 130 may be integrated into a single display driver chip. In some other embodiments, the source driver 120 and the scan driver 130 may also be separate chips. According to different design requirements, in some embodiments, the implementation of the source driver 120 and/or the scan driver 130 may be a hardware circuit. In other embodiments, the implementation of the source driver 120 and/or the scan driver 130 may be firmware, software (i.e., a program), or a combination of the two. In yet other embodiments, the implementation of the source driver 120 and/or the scan driver 130 may be a combination of hardware, firmware, and software.

In terms of hardware, the source driver 120 and/or the scan driver 130 may be implemented as a logic circuit on an integrated circuit. For example, the above-mentioned related functions of the source driver 120 and/or the scan driver 130 may be implemented in one or more controllers, microcontrollers, microprocessors, application-specific integrated circuits (ASIC), digital signal processor (DSP), field programmable gate array (FPGA), and/or various logic blocks, modules, and circuits in other processing units. The above-mentioned related functions of the source driver 120 and/or the scan driver 130 may be implemented as hardware circuits by using hardware description languages (e.g., Verilog HDL or VHDL), or other suitable programming languages, such as various logic blocks, modules, and circuits in integrated circuits.

In terms of software and/or firmware, the above-mentioned related functions of the source driver 120 and/or the scan driver 130 may be implemented as programming codes. For example, the source driver 120 and/or the scan driver 130 may be implemented using general programming languages (e.g., C, C++, or assembly language) or other suitable programming languages. The programming code may be recorded/stored in a "non-transitory readable medium". In some embodiments, the non-transitory readable medium includes, for example, a semiconductor memory and/or a storage device. An electronic device (e.g., a central processing unit (CPU), a controller, a microcontroller, or a microprocessor) may read and execute the programming code from the non-transitory readable medium, thereby achieving related functions of the source driver 120 and/or the scan driver 130.

The scan driver 130 is coupled to multiple scan lines disposed in the LED panel 110, such as the scan lines S1_1, S1_2, . . . , S1_N shown in FIG. 1. The number N of the scan lines S1_1 to S1_N may be determined according to actual design. The scan driver 130 scans the scan lines S1_1 to S1_N during multiple scan line periods of one display frame period. The source driver 120 is coupled to multiple data lines disposed in the LED panel 110, such as the data lines D1_1, D1_2, . . . , D1_M shown in FIG. 1. The number M of the data lines D1_1 to D1_M may be determined according to actual design. In any of the scan line periods, based on the scanning time sequence of the scan driver 130 on the scan lines S1_1 to S1_N, the source driver 120 may output driving currents to the data lines D1_1 to D1_M to drive the LED array of the LED panel 110.

According to actual design, any LED symbol (LED circuit) in the LED array 110 of the LED panel 110 shown in FIG. 1 may represent a single LED, or may represent an LED string with multiple LEDs. In some embodiments, the LED panel 110 shown in FIG. 1 may be an LED display panel, such as a micro-LED display panel, an organic light-emitting diode (OLED) display panel, or other LED display panels. In other embodiments, the LED panel 110 shown in FIG. 1 may be an LED backlight panel. The LED backlight panel may realize local dimming and generate backlight for a liquid crystal display (LCD) panel (not shown).

The LED panel 110 shown in FIG. 1 may be a passive matrix (PM) LED panel. As one of various application examples, the LED panel 110 shown in FIG. 1 is a common cathode LED panel. In another application example, the LED panel 110 shown in FIG. 1 may be a common anode LED panel by analogy.

Figure 2:
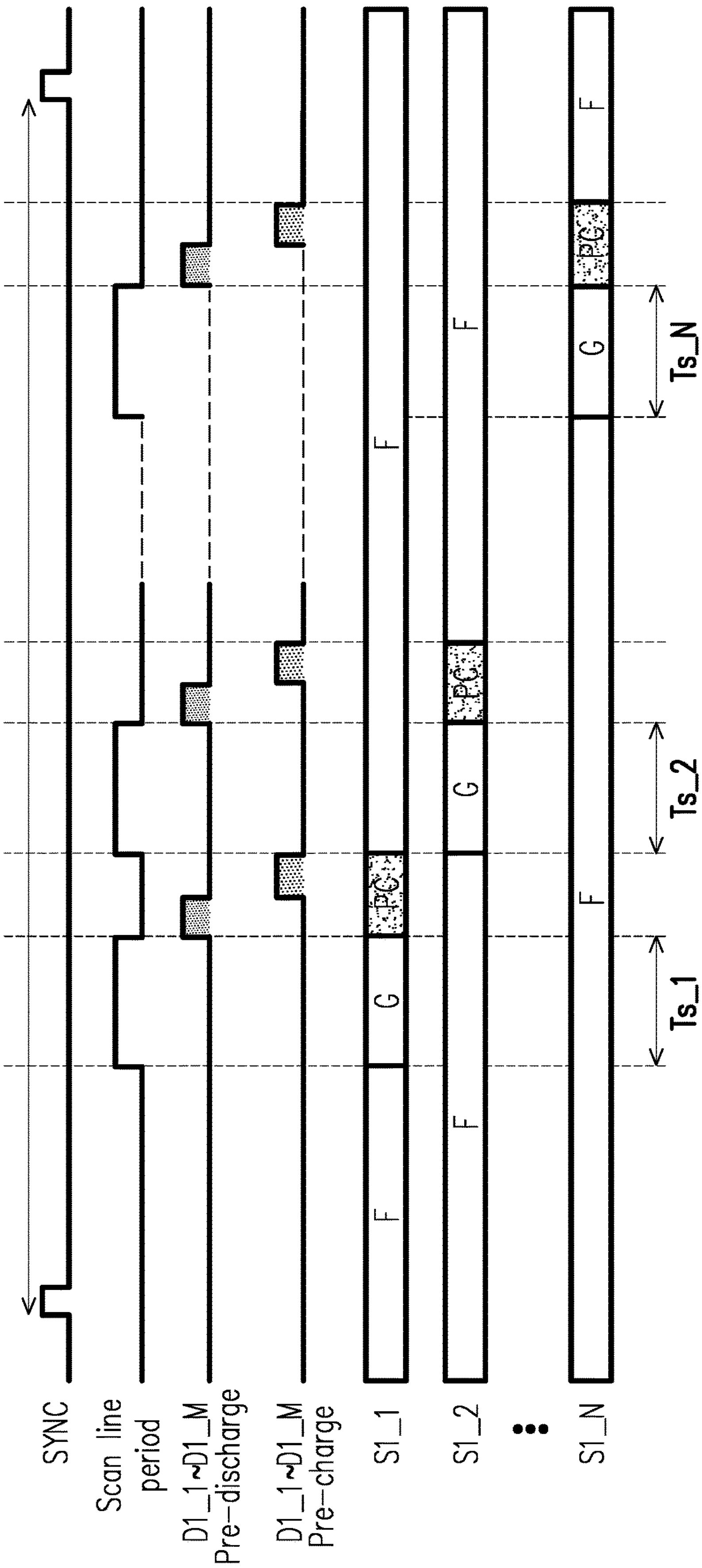
FIG. 2 is a schematic diagram of an operation time sequence of a passive matrix light-emitting diode panel based on an embodiment.

FIG. 2 is a schematic diagram of an operation time sequence of a passive matrix (PM) light-emitting diode (LED) panel 110 based on an embodiment. The horizontal axis in FIG. 2 represents time. Two adjacent pulses of a synchronization signal SYNC may define a display frame period. Based on actual design, a display frame period may be set to 1/60 second or other period values. A display frame period may include multiple scan line periods. The waveform "scan line period" shown in FIG. 2 is not the signal waveform measured on the physical circuit.

Each pulse width of the waveform "scan line period" represents an active period in a scan line period. The sequence of active periods of different scan lines of the LED panel 110 is presented in the same waveform "scan line period". Each row of LED circuits of the LED panel 110 may display (emit light or not emit light) during an active period in a corresponding scan line period.

FIG. 2 shows time sequence curves of different scan channels of the scan driver 130 performing driving operation on the scan lines S1_1 to S1_N of the LED panel 110. In the embodiment shown in FIG. 2, "F" represents that the scan line is set to be electrically floating, "G" represents that the scan line is scanned (i.e., the scan line is applied with an enable voltage, such as a ground voltage or other voltages), and "PC" represents that the scan line is pre-charged (i.e., the scan line is applied with a pre-charge voltage).

FIG. 2 also shows time sequence curves of the data lines D1_1 to D1_M of the LED panel 110 being pre-discharged and pre-charged by a certain driving channel of the source driver 120. The pre-discharge waveforms and the pre-charge waveforms of the data lines D1_1 to D1_M shown in FIG. 2 are not the signal waveforms measured on the physical circuit. Each pulse of the waveform "D1_1 to D1_M pre-discharge" represents that "the source driver 120 applies a pre-discharge voltage to the data lines D1_1 to D1_M". Each pulse of the waveform "D1_1 to D1_M pre-charge" represents that "the source driver 120 applies a pre-charge voltage to the data lines D1_1 to D1_M".

The source driver 120 is a constant current driver. Based on the scanning time sequence of the scan driver 130 on the scan lines S1_1 to S1_N, the source driver 120 may synchronously output driving currents to the data lines D1_1 to D1_M during the active periods Ts_1 to Ts_N to drive the LED array of the LED panel 110. For example, in the active period Ts_1, the scan driver 130 applies an enable voltage (such as the ground voltage or other voltages) to the scan line S1_1, and the source driver 120 selectively outputs a driving current to the data line D1_1 to drive the LED L11 of the LED panel 110. In the active period Ts_2, the scan driver 130 applies an enable voltage to the scan line S1_2, and the source driver 120 selectively outputs a driving current to the data line D1_1 to drive the LED L21 of the LED panel 110.

An example of the data lines of the LED panel 110 being pre-discharged by the source driver 120 is described herein. In the active period Ts_1 of the first scan line period, the scan driver 130 applies an enable voltage to the scan line S1_1 to enable all the LEDs (e.g., the LED L11 and the LED L12) connected to the scan line S1_1, and the scan driver 130 sets the other scan lines S1_2 to S1_N to be electrically floating, so as to disable the LEDs (e.g., the LED L21 and the LED L22) connected to the other scan lines S1_2 to S1_N. It is assumed that in the active period Ts_1 of the first scan line period, the source driver 120 provides a low voltage to the data line D1_1 and a high voltage to the data line D1_2, so that the LED L11 does not emit light and the LED L12 emits light. Therefore, the data line D1_2 is still at a high voltage after the active period Ts_1 ends and before the active period Ts_2 starts.

Similarly, in the active period Ts_2 of the second scan line period, the scan driver 130 applies an enable voltage to the scan line S1_2 to enable all the LEDs (e.g., the LED L21 and the LED L22) connected to the scan line S1_2, and the scan driver 130 sets the other scan lines (e.g., the scan lines and S1_N) to be electrically floating, so as to disable the other LEDs. As mentioned above, the data line D1_2 is still at a high voltage after the active period Ts_1 of the first scan line period ends. Therefore, when the scan driver 130 applies the enable voltage to the scan line S1_2, the LED L22 of the LED panel 110 emits light unexpectedly. The unexpected light emission of the LED L22 is a bottom row afterimage phenomenon. In order to remedy the bottom row afterimage, the source driver 120 pre-discharges the data lines D1_1 to D1_M of the LED panel 110 after the active period Ts_1 of the first scan line period ends. The operation time sequence of the pre-discharge may refer to each pulse of the waveform "D1_1 to D1_M pre-discharge" shown in FIG. 2. An example of the data lines of the LED panel 110 being pre-charged by the source driver 120 is described herein. It is assumed that in the active period Ts_1 of the first scan line period, the source driver 120 provides a high voltage to the data lines D1_1 and D1_2, so that the LEDs L11 and L12 emit light. Inevitably, the data lines of the LED panel 110 have parasitic capacitance, which causes the source driver 120 to light up the LEDs L11 and L12 after a charging period has passed after the high voltage is provided. In order to shorten the charging period as much as possible, the source driver 120 may pre-charge the data lines D1_1 to D1_M of the LED panel 110 after the pre-discharging operation period ends and before the active period Ts_2 of the second scan line period starts, to accelerate turning on the LED. The operation time sequence of the pre-charging may refer to each pulse of the waveform "D1_1 to D1_M pre-charge" shown in FIG. 2.

An example of the scan lines of the LED panel 110 being pre-charged by the scan driver 130 is described herein. It is assumed that in the active period Ts_1 of the first scan line period, the source driver 120 provides a low voltage to the data line D1_1 and a high voltage to the data line D1_2, so that the LED L11 does not emit light and the LED L12 emits light. Since the scan driver 130 enables the scan line of the LED panel 110 during the active period Ts_1 of the first scan line period, the scan line is still at the enable voltage after the active period Ts_1 ends.

It is assumed that the LED L21 of the LED panel 110 is intended to emit light during the active period Ts_2 of the second scan line period. As mentioned above, the scan line is still at the enable voltage after the active period Ts_1 of the first scan line period ends, therefore, when the source driver 120 provides a high voltage to the data line D1_1 during the active period Ts_2 of the second scan line period, the LED L11 of the LED panel 110 emits light unexpectedly. The unexpected light emission of the LED L11 is a top row afterimage phenomenon. In order to remedy the top row afterimage, the scan driver 130 may pre-charge the scan line of the LED panel 110 (i.e., the "PC" marked in FIG. 2) after the active period Ts_1 of the first scan line period ends. Similarly, the scan driver 130 may pre-charge the scan line S1_2 of the LED panel 110 after the active period Ts_2 of the second scan line period ends. The operation time sequence of the pre-charging may refer to the time sequence of the pre-charge "PC" shown in FIG. 2.

The case of "possibly damaging the LED" caused by setting the scan lines as electrically floating in the embodiment shown in FIG. 2 is described herein. In the active period Ts_1 of the first scan line period, the scan driver 130 provides an enable voltage to the scan line of the LED panel 110 to enable the LEDs connected to the scan line S1_1, while the other scan lines S1_2 to S1_N are set to be electrically floating to disable the other LEDs. In the active period Ts_2 of the second scan line period, the scan driver 130 provides an enable voltage to the scan line S1_2 of the LED panel 110, while the other scan lines are set to be electrically floating. By analogy, in the active period Ts_N of the N th scan line period, the scan driver 130 provides an enable voltage to the scan line S1_N of the LED panel 110, while the other scan lines are set to be electrically floating.

It is assumed that in the active period Ts_1 of the first scan line period, the source driver 120 maintains the data line D1_1 at a low voltage that prevents the LED L11 from being lit up, and the source driver 120 pulls up the voltages of the other data lines D1_2 to D1_M to light up the LEDs. Since the scan driver 130 sets the scan lines S1_2 to S1_N to be electrically floating during the active period Ts_1 of the first scan line period, the voltage transitions of the data lines D1_2 to D1_M are coupled to the disabled scan lines S1_2 to S1_N through the parasitic capacitance of the LEDs of the LED panel 110, causing the voltages of the disabled scan lines S1_2 to S1_N to also undergo unexpected transitions. The problems caused by unexpected transitions in the voltage of the scan lines are further explained below.

Since the disabled scan lines S1_2 to S1_N are set to be electrically floating during the active period Ts_1 of the first scan line period, the voltages of the disabled scan lines S1_2 to S1_N transition to a high voltage in response to the voltage transitions of the data lines D1_2 to D1_M. Since the source driver 120 maintains the data line D1_1 at a low voltage, and the voltages of the currently disabled scan lines S1_2 to S1_N are at a high voltage, therefore, all the LEDs connected to the data line D1_1 and the currently disabled scan lines S1_2 to S1_N (e.g., the LED L21) are reverse biased. Long-term reverse bias may damage the LEDs.

In addition, unexpected voltage transitions of the scan lines may erroneously light up the LEDs of the LED panel 110. It is assumed that in the active period Ts_1, the source driver 120 outputs a low voltage to the data line D1_1 that prevents the LED L11 from being lit up, and the source driver 120 pulls up the voltages of the other data lines D1_2 to D1_M to light up the LEDs. However, since the disabled scan lines S1_2 to S1_N are set to be electrically floating during the active period Ts_1, the voltages of the disabled scan lines S1_2 to S1_N transition to a high voltage in response to the voltage transitions of the data lines D1_2 to D1_M, while the voltage transitions coupled to the disabled scan lines S1_2 to S1_N are further coupled to the data line D1_1 through the parasitic capacitance of the LEDs of the LED panel 110. That is, in the active period Ts_1 of the first scan line period, the data line D1_1 should be at a low voltage, but an unexpected high voltage pulse appears on the data line D1_1 due to the coupling effect. The unexpected high voltage pulses may erroneously light up the LED L11 of the LED panel 110, which is a ghosting phenomenon. The following embodiments describe how the driving device and the LED panel perform de-ghosting operations.

Figure 3:
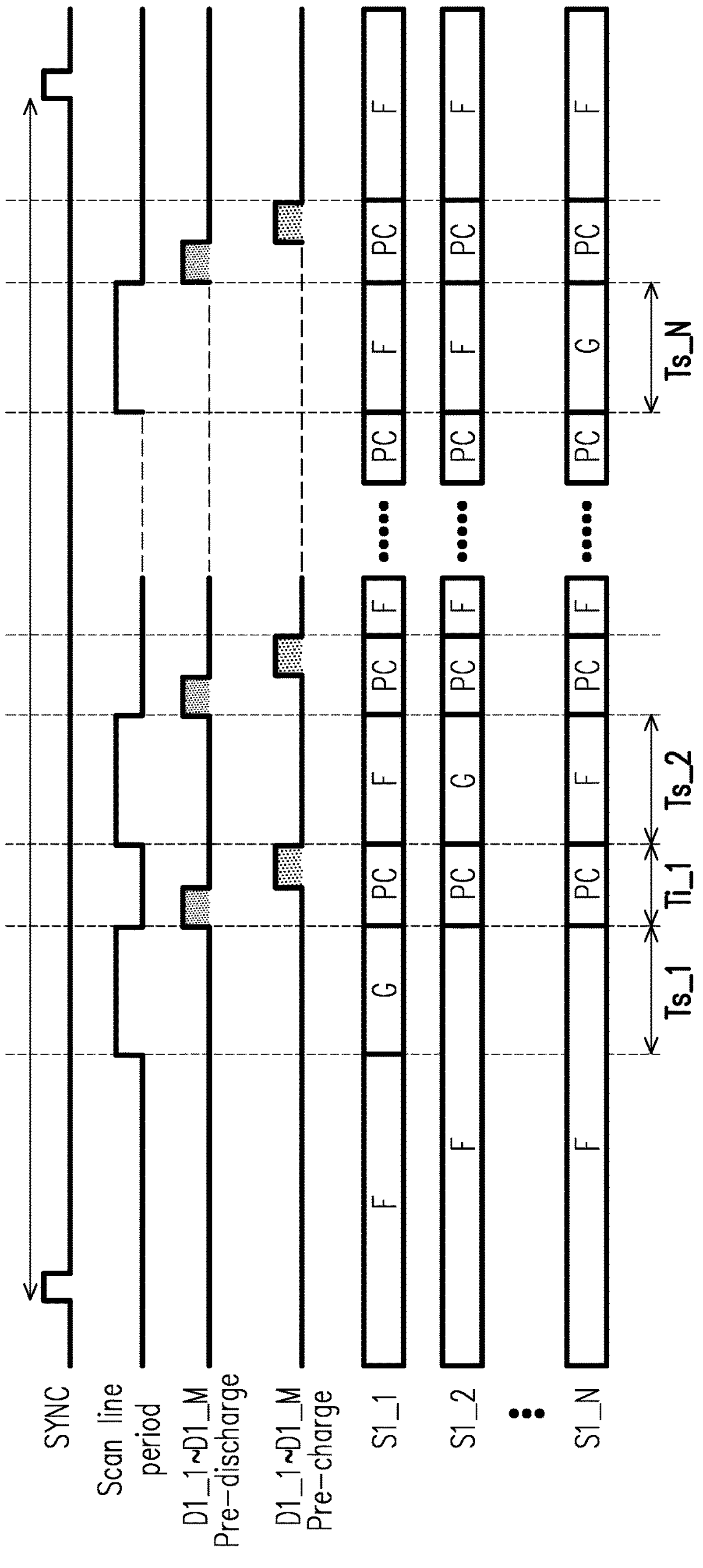
FIG. 3 is a schematic diagram of time sequence curves of different scan channels of the scan driver performing driving operation on the scan lines of the LED panel according to another embodiment.

FIG. 3 is a schematic diagram of time sequence curves of different scan channels of the scan driver 130 performing driving operation on the scan lines S1_1 to S1_N of the LED panel 110 according to another embodiment. The horizontal axis in FIG. 3 represents time. The electrically floating "F", the scan "G" and the pre-charge "PC" shown in FIG. 3 may refer to the relevant description in FIG. 2 by analogy. The waveform "SYNC", the waveform "scan line period", the waveform "D1_1 to D1_M pre-discharge" and the waveform "D1_1 to D1_M pre-charge" shown in FIG. 3 may refer to the relevant description of the waveform "SYNC", the waveform "scan line period", the waveform "D1_1 to D1_M pre-discharge" and the waveform "D1_1 to D1_M pre-charge" shown in FIG. 2, so they are not repeated herein.

Referring to FIG. 1 and FIG. 3, an inactive period is configured between the active periods of any two adjacent scan line periods. For example, the inactive period T1_1 is configured between the active period Ts_1 and the active period Ts_2. The scan driver 130 pre-charges all the scan lines S1_1 to S1_N (i.e., the "PC" marked in FIG. 3) after each active period Ts_1 to Ts_N ends, so as to maintain all the scan lines S1_1 to S1_N at the pre-charge voltage. Therefore, the embodiment shown in FIG. 3 may prevent the disabled scan line from being coupled to a high voltage, thereby preventing all the LEDs connected to the disabled scan line from being reverse biased. Reducing the chance of the LED of being reverse biased may prolong the life of the LED.

Moreover, all the scan lines S1_1 to S1_N are maintained at the pre-charge voltage during the inactive period between any two adjacent active periods, so the embodiment shown in FIG. 3 may have the function of eliminating ghosting.

Figure 4:
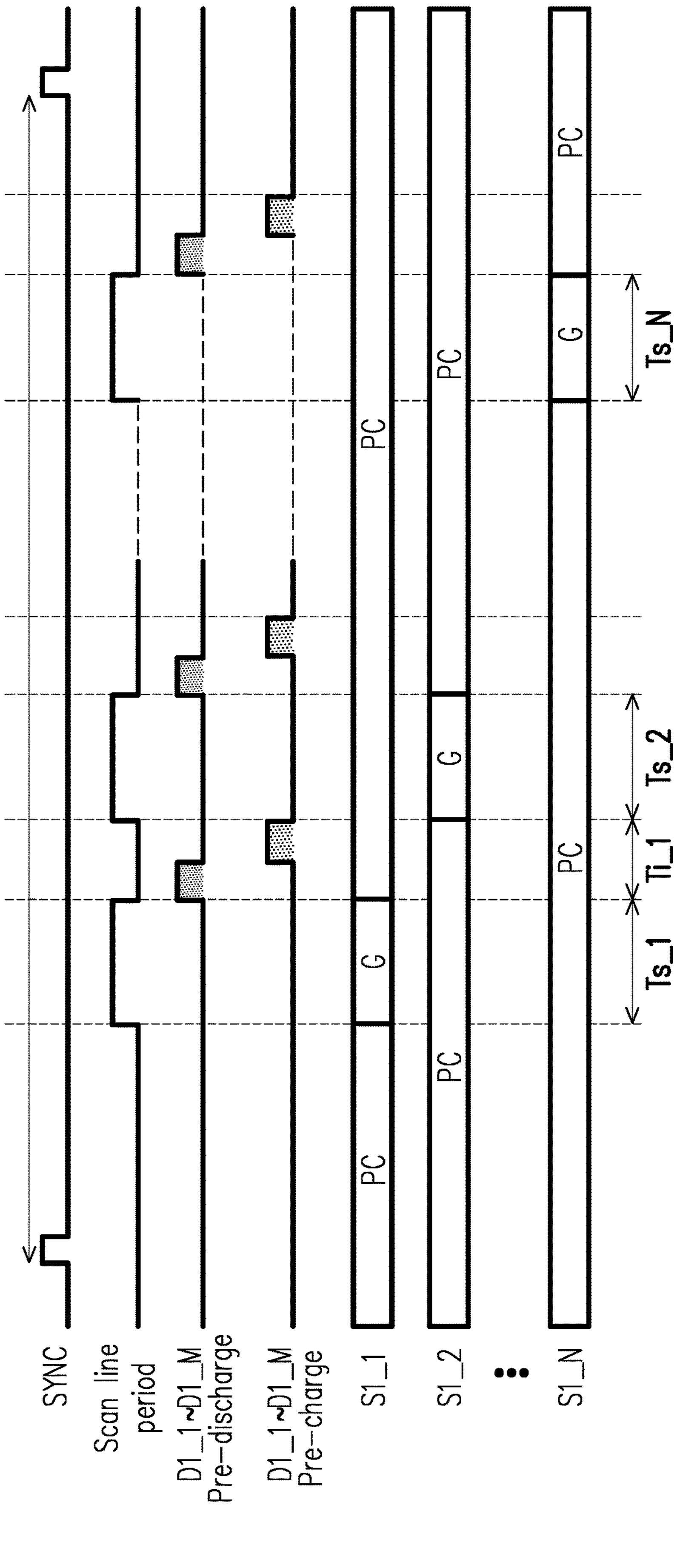
FIG. 4 is a schematic diagram of time sequence curves of different scan channels of the scan driver performing driving operation on the scan lines of the LED panel according to yet another embodiment.

FIG. 4 is a schematic diagram of time sequence curves of different scan channels of the scan driver 130 performing driving operation on the scan lines S1_1 to S1_N of the LED panel 110 according to yet another embodiment. The horizontal axis in FIG. 4 represents time. The scan "G" and the pre-charge "PC" shown in FIG. 4 may refer to the relevant description in FIG. 2 by analogy. The waveform "SYNC", the waveform "scan line period", the waveform "D1_1 to D1_M pre-discharge" and the waveform "D1_1 to D1_M pre-charge" shown in FIG. 4 may refer to the relevant description of the waveform "SYNC", the waveform "scan line period", the waveform "D1_1 to D1_M pre-discharge" and the waveform "D1_1 to D1_M pre-charge" shown in FIG. 2, so they are not repeated herein. An inactive period is configured between the active periods of any two adjacent scan line periods. For example, the inactive period T1_1 is configured between the active period Ts_1 and the active period Ts_2.

Referring to FIG. 1 and FIG. 4, in any one of the active periods Ts_1 to Ts_N of the scan line periods, the scan driver 130 applies an enable voltage (e.g., a ground voltage or other voltages) to the current scan line among the scan lines S1_1 to S1_N (i.e., the "G" marked in FIG. 4), and the scan driver 130 applies a pre-charge voltage to a first other scan line among the scan lines (i.e., the "PC" marked in FIG. 4). The level of the pre-charge voltage may be determined according to the actual design. The pre-charge voltage is set at a proper voltage, so that the LEDs connected to the disabled scan lines do not emit light during the pre-charging period "PC" of the scan lines to S1_N regardless of the voltage of the data lines D1_1 to D1_M.

In the active period Ts_1, the scan driver 130 provides an enable voltage to the scan line S1_1 (i.e., the "G" marked in FIG. 4), and the scan driver 130 provides a pre-charge voltage to other scan lines S1_2 to S1_N (i.e., the "PC" marked in FIG. 4). The other scan lines S1_2 to S1_N are kept at the pre-charge voltage (not floating), so the voltage transitions of the data lines D1_1 to D1_M are not coupled to the disabled scan lines S1_2 to S1_N, of course, the voltage transition of any data line are also not coupled to other data lines through the disabled scan lines S1_2 to S1_N. Based on this, the ghosting phenomenon may be eliminated by using the time sequence embodiment shown in FIG. 4.

In the inactive period T1_1, the scan driver 130 continuously applies the pre-charge voltage to all the scan lines S1_1 to S1_N to disable the LED array. The source driver 120 pre-discharges the data lines D1_1 to D1_M during a first period of the inactive period T1_1. The source driver 120 pre-charges the data lines D1_1 to D1_M during a second period of the inactive period T1_1. The operation of the inactive period T1_1 shown in FIG. 4 may refer to the relevant descriptions of FIG. 2 and/or FIG. 3, so details are not repeated herein.

The LED array may have a short-circuited LED (a faulty LED), which leads to the case where "another LED may be erroneously lit" in the embodiment shown in FIG. 4 is described herein. It is assumed that the source driver 120 provides a low voltage to the data line D1_1 that is not sufficient to light up the LED L11 during the active period Ts_1, so the LED L11 should not be lit up during the active period Ts_1. It is also assumed that the LED L21 coupled between the data line D1_1 and the scan line S1_2 is a short-circuited LED (faulty LED). At this time, the pre-charge voltage of the scan line S1_2 erroneously pulls up the voltage of the data line D1_1 through the short-circuited LED L21, therefore the LED L11 is erroneously lit up.

The LED array may have a short-circuited LED (a faulty LED), which leads to the erroneous case where "the brightness of the LED that should be lit up may be abnormal, or the LED may even be unable to light up" in the embodiment shown in FIG. 4 is described herein. It is assumed that the source driver 120 provides a driving current to the data line D1_1 during the active period Ts_1, so the LED L11 should be lit up during the active period Ts_1. It is still assumed that the LED L21 coupled between the data line D1_1 and the scan line S1_2 is a short-circuited LED (faulty LED), so that the driving current of the data line D1_1 is shunted to the scan line S1_2 through the short-circuited LED L21, thereby pulling down the current of the LED L11. Therefore, in the active period Ts_1, the brightness of the LED L11 is abnormal due to the short-circuiting of other LEDs L21, or the LED L11 is even unable to light up.

Figure 5:
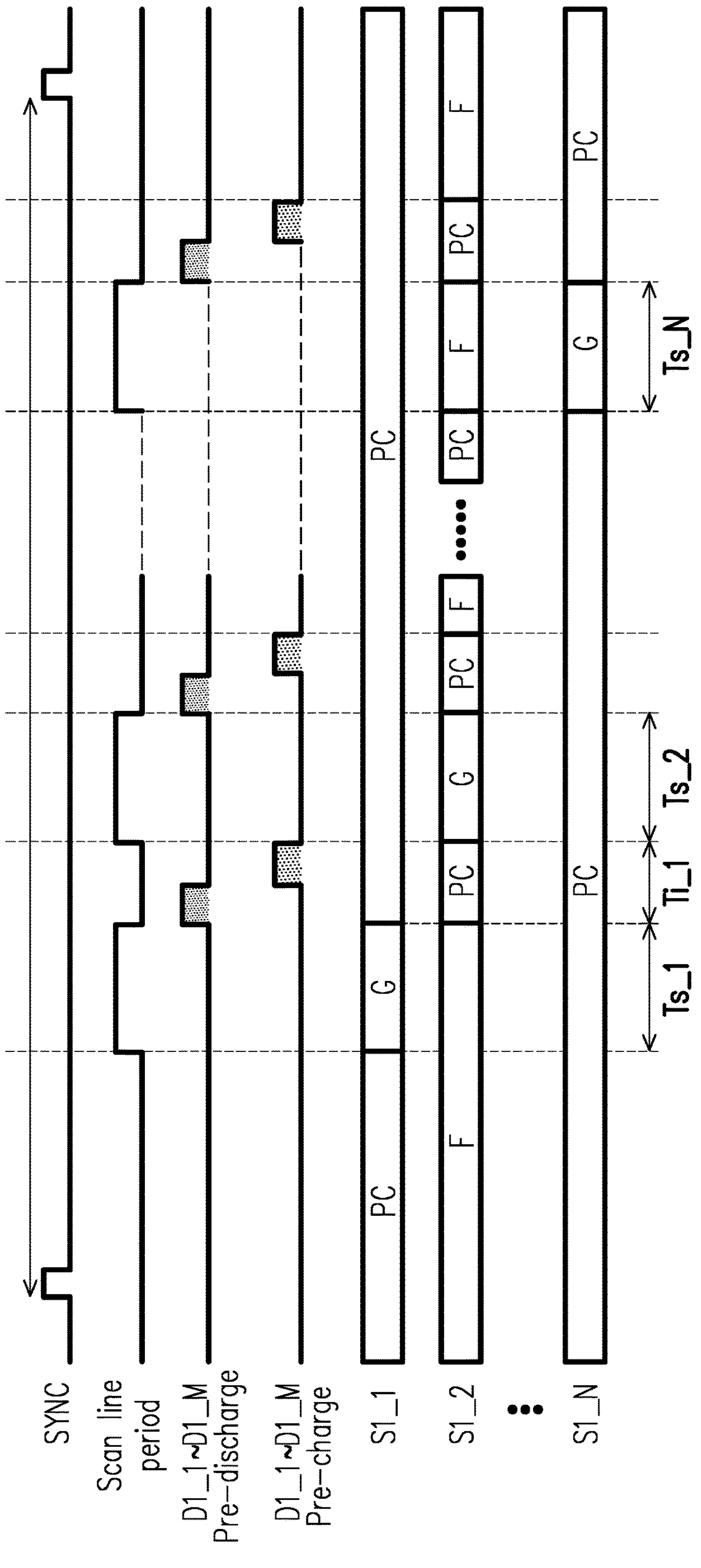
FIG. 5 is a schematic diagram of time sequence curves of different scan channels of the scan driver performing driving operation on the scan lines of the LED panel according to still another embodiment.

FIG. 5 is a schematic diagram of time sequence curves of different scan channels of the scan driver 130 performing driving operation on the scan lines to S1_N of the LED panel 110 according to still another embodiment. The horizontal axis in FIG. 5 represents time. The electrically floating "F", the scan "G" and the pre-charge "PC" shown in FIG. 5 may refer to the relevant description in FIG. 2 by analogy. The waveform "SYNC", the waveform "scan line period", the waveform "D1_1 to D1_M pre-discharge" and the waveform "D1_1 to D1_M pre-charge" shown in FIG. 5 may refer to the relevant description of the waveform "SYNC", the waveform "scan line period", the waveform "D1_1 to D1_M pre-discharge" and the waveform "D1_1 to D1_M pre-charge" shown in FIG. 2, so they are not repeated herein. An inactive period is configured between the active periods of any two adjacent scan line periods. For example, the inactive period T1_1 is configured between the active period Ts_1 and the active period Ts_2.

FIG. 5 describes the solution to prevent short-circuited LEDs from causing other LEDs to display erroneously (erroneous light-up or abnormal brightness). The actual scenario shown in FIG. 5 assumes that the scan line connected to a short-circuited LED (faulty LED) is the scan line S1_2, and the other scan lines (e.g., and S1_N) are not connected to any short-circuited LEDs. The difference from the method shown in FIG. 4 is the pre-charging time sequence of the scan line S1_2 shown in FIG. 5. Referring to FIG. 1 and FIG. 5, for the scan lines (e.g., and S1_N) that are not connected to any short-circuited LEDs, the pre-charge time sequence of the scan lines and S1_N shown in FIG. 4 may be used. For the scan line S1_2 connected to the short-circuited LED, the scan driver 130 may perform a pre-charging operation on the scan line S1_2 (i.e., the "PC" marked in FIG. 5) in the inactive period after each active period Ts_1 to Ts_N ends, and does not stop until the next active period starts. For the scan line S1_2 connected to the short-circuited LED, the driving time sequence of the scan line S1_2 shown in FIG. 3 may be used.

That is to say, in any active period Ts_1 to Ts_N, the scan driver 130 applies an enable voltage to the current scan line among the scan lines S1_1 to S1_N (i.e., the "G" marked in FIG. 5), the scan driver 130 applies a pre-charge voltage to the first other scan line that is not connected to any short-circuited LED among the scan lines S1_1 to S1_N (i.e., the "PC" marked in FIG. 5), and the scan driver 130 sets the second other scan line connected to the short-circuited LED among the scan lines S1_1 to S1_N to be electrically floating (i.e., the "F" marked in FIG. 5). The scan line S1_2 coupled to the short-circuited LED (faulty LED) is set to be electrically floating during non-scanning periods (e.g., Ts_1 and Ts_N), so the scan line S1_2 does not shunt the driving current of the data line, thereby preventing other normal LEDs from having abnormal brightness. In a preferred embodiment, the pre-charging operation period of the scan line S1_2 connected to the short-circuited LED (i.e., the "PC" marked in FIG. 5) covers the pre-charging period of the data lines D1_1 to D1_M, to prevent the pre-charge voltage of the data lines D1_1 to D1_M from being transmitted to the scan line S1_2 connected to the short-circuited LED through the short-circuited LED.

The following embodiment describes the mechanism of detecting a short-circuited LED. Based on the detection result, the scan driver 130 may dynamically adjust the driving time sequence of each scan line S1_1 to S1_N. Taking the specific scenario shown in FIG. 5 as an example, the dynamically adjusted driving time sequence may prevent the scan line S1_2 connected to the short-circuited LED from interfering with the data lines D1_1 to D1_M during the non-scanning period (e.g., Ts_1 and Ts_N), and keep the data lines D1_1 to D1_M D1_M from being susceptible to coupling effects.

Figure 6:
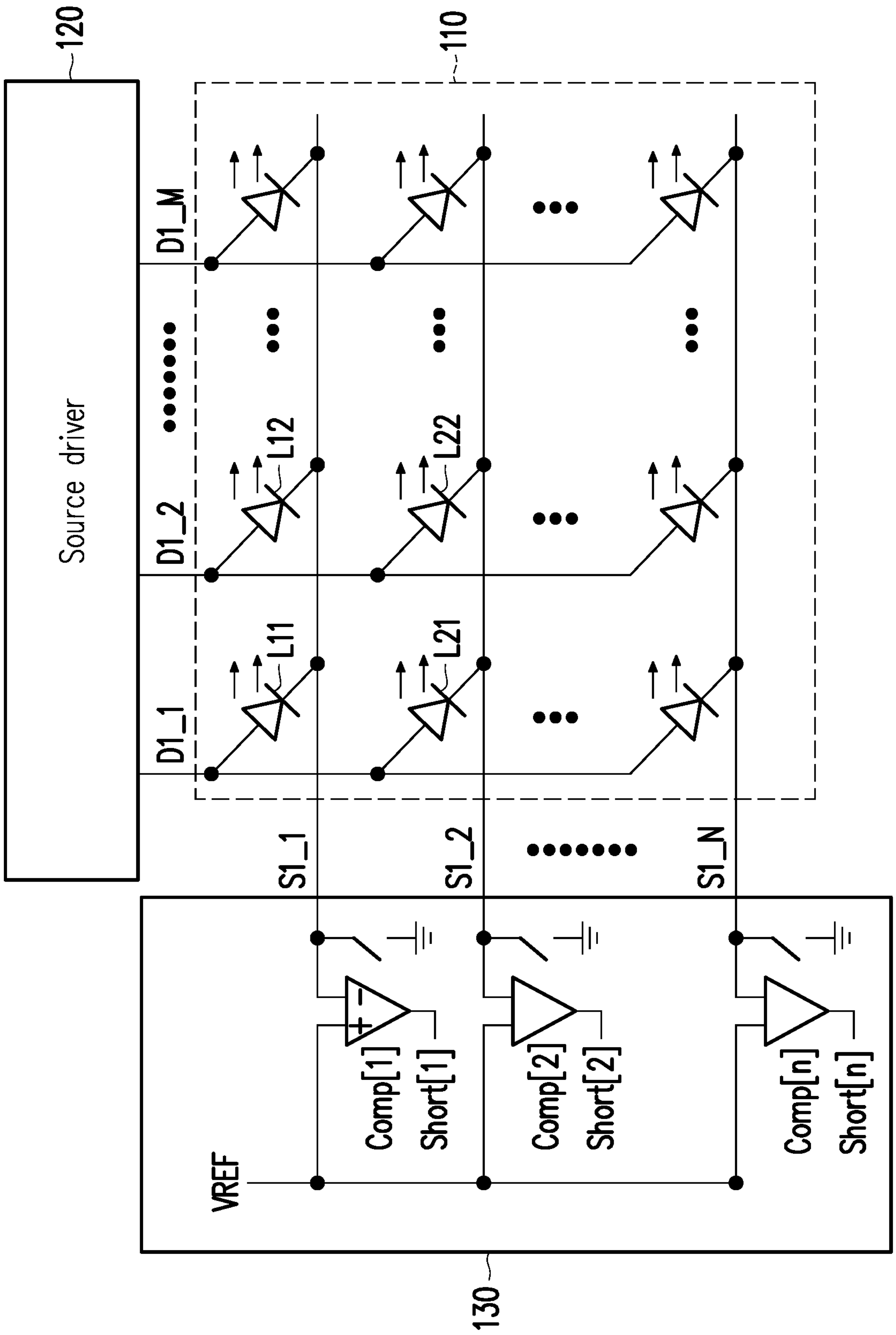
FIG. 6 is a schematic diagram of a circuit block of a display device according to another embodiment of the disclosure.

FIG. 6 is a schematic diagram of a circuit block of a display device according to another embodiment of the disclosure. The display device shown in FIG. 6 includes an LED panel 110 and a driving device, in which the driving device includes a source driver 120 and a scan driver 130. The LED panel 110, the source driver 120, and the scan driver 130 shown in FIG. 6 may refer to the related descriptions of the LED panel 110, the source driver 120, and the scan driver 130 shown in FIG. 1 by analogy, so details are not repeated herein. The scan driver 130 shown in FIG. 6 may apply a pre-charge voltage to the scan lines S1_1 to S1_N during a short-circuit detection period before or after all the scan line periods in a display frame period, the source driver 120 may pre-discharge the data lines D1_1 to D1_M during the short-circuit detection period, and the scan driver 130 may detect the voltage of any one of the scan lines S1_1 to S1_N during the short-circuit detection period to determine whether any one of the scan lines S1_1 to S1_N is connected to any short-circuited LED.

In the embodiment shown in FIG. 6, the scan driver 130 includes voltage comparators Comp[1], Comp[2], . . . , and Comp[n]. The first input terminals (e.g., non-inverting input terminals) of the voltage comparators Comp[1] to Comp[n] receive the reference voltage VREF. The second input terminals (e.g., inverting input terminals) of the voltage comparators Comp[1] to Comp[n] are respectively coupled to the scan lines S1_1 to S1_N, as shown in FIG. 6. The voltage comparators Comp[1] to Comp[n] compare each voltage of the scan lines S1_1 to S1_N with the reference voltage VREF, and output comparison results Short[1], Short[2], . . . , Short[n].

Figure 7:
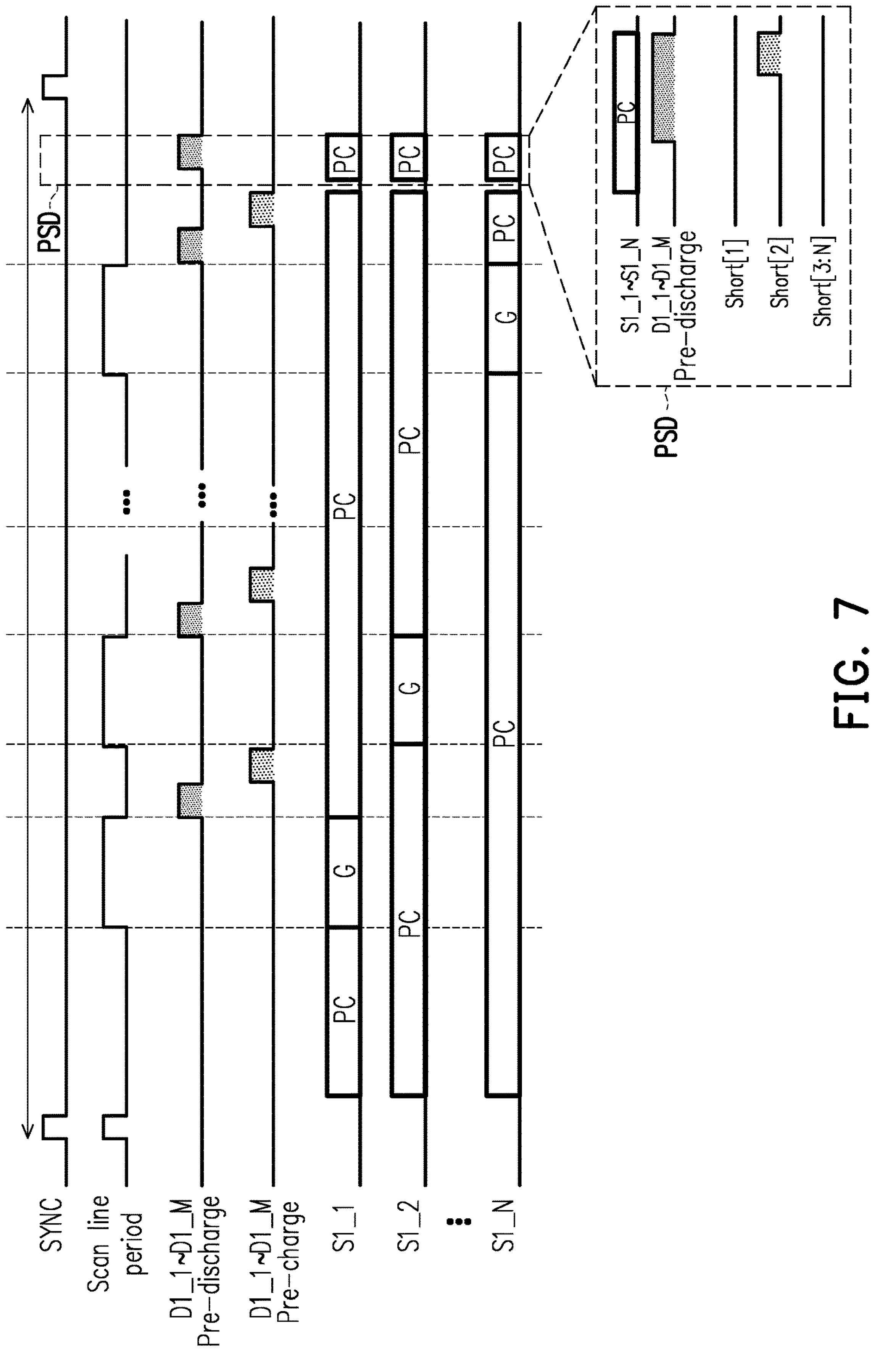
FIG. 7 is a schematic diagram of the operation time sequence of the LED short-circuit detection function according to an embodiment of the disclosure.

FIG. 7 is a schematic diagram of the operation time sequence of the LED short-circuit detection function according to an embodiment of the disclosure. The horizontal axis in FIG. 7 represents time. The scan "G" and the pre-charge "PC" shown in FIG. 7 may refer to the relevant description in FIG. 2 by analogy. The waveform "SYNC", the waveform "scan line period", the waveform "D1_1 to D1_M pre-discharge" and the waveform "D1_1 to D1_M pre-charge"

shown in FIG. 7 may refer to the relevant description of the waveform "SYNC", the waveform "scan line period", the waveform "D1_1 to D1_M pre-discharge" and the waveform "D1_1 to D1_M pre-charge" shown in FIG. 2, and the driving time sequence of the scan lines S1_1 to S1_N shown in FIG. 7 may refer to the relevant description of the driving time sequence of the scan lines S1_1 to S1_N shown in FIG. 4, so they are not repeated herein.

The circuit shown in FIG. 6 may run the operation time sequence shown in FIG. 7. In the embodiment shown in FIG. 7, the short-circuit detection period PSD is configured after all scan line periods in a display frame period. The blank time at the end of each display frame period (e.g., the vertical blank period between two display frame periods) may serve as the short-circuit detection period PSD. In the short-circuit detection period PSD, the scan driver 130 may pre-charge all the scan lines S1_1 to S1_N of the LED panel 110 (the "PC" marked in FIG. 5, that is, provide a pre-charge voltage to all the scan lines). At the same time, the source driver 120 may pre-discharge all the data lines D1_1 to D1_M of the LED panel 120 (i.e., provide a pre-discharge voltage to all the data lines). The operation of pre-charging the scan lines S1_1 to S1_N during the short-circuit detection period PSD and the operation of pre-charging the scan lines S1_1 to S1_N before the short-circuit detection period PSD may be continuous or discontinuous. If all the LEDs connected to the same scan line are not short-circuited LEDs, the voltage level of the scan line should be approximately the pre-charge voltage during the short-circuit detection period PSD. If any of the LEDs connected to the same scan line is a short-circuited LED, the pre-discharge voltage of the data lines D1_1 to D1_M pulls down the voltage level of the scan line through the short-circuited LED during the short-circuit detection period PSD.

Each of the voltage comparators Comp[1] to Comp[n] shown in FIG. 6 may compare the voltage levels of all the scan lines S1_1 to S1_N with the reference voltage VREF and output comparison results Short[1] to Short[n]. For example, it is assumed that the scan line S1_1 is not connected to a short-circuited LED. When the voltage level of the scan line S1_1 is higher than the reference voltage VREF, that is, the voltage level of the scan line S1_1 is approximately the pre-charge voltage during the short-circuit detection period PSD, the comparison result Short [1] of the scan line S1_1 is a first logic state (e.g., a low logic level, representing that the scan line S1_1 is not connected to a short-circuited LED). For the scan line S1_1 not connected to the short-circuited LED, in the following other display frame periods, the driving time sequence of the scan line S1_1 may use the driving time sequence of the scan line S1_1 shown in FIG. 4 (or FIG. 5).

It is assumed that the scan line S1_2 is connected to a short-circuited LED. When the voltage level of the scan line S1_2 is lower than the reference voltage VREF, that is, the pre-discharge voltage of the data lines D1_1 to D1_M pulls down the voltage level of the scan line S1_2 through the short-circuited LED during the short-circuit detection period PSD. Then the comparison result Short[2] of the scan line S1_2 is a second logic state (e.g., a high logic level, representing that the scan line S1_2 is connected to a short-circuit LED). For the scan line S1_2 connected to the short-circuited LED, in the following other display frame periods, the driving time sequence of the scan line S1_2 may be the same as the driving time sequence of the scan line S1_2 shown in FIG. 5.

Figure 8:
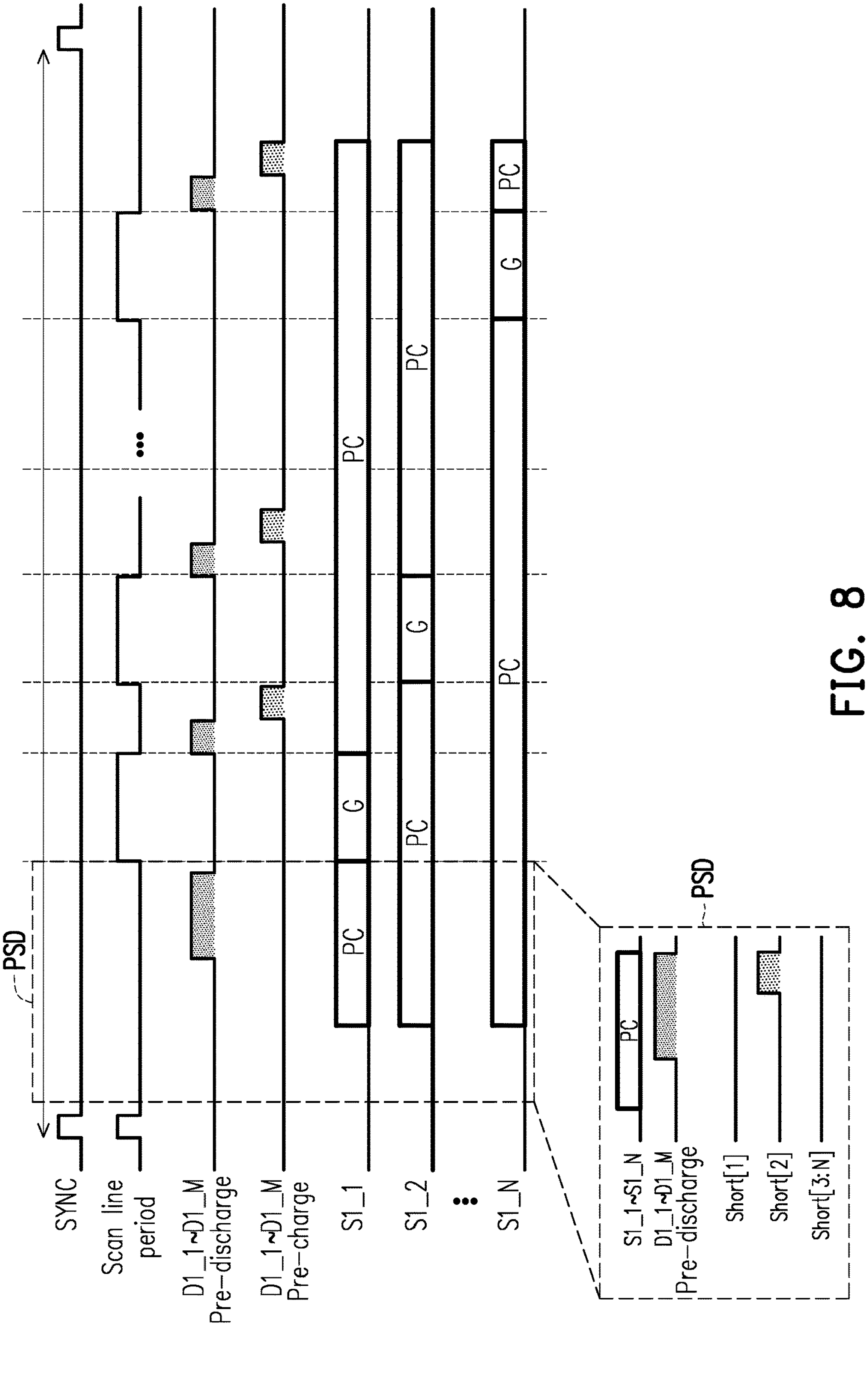
FIG. 8 is a schematic diagram of the operation time sequence of the LED short-circuit detection function according to another embodiment of the disclosure.

FIG. 8 is a schematic diagram of the operation time sequence of the LED short-circuit detection function according to another embodiment of the disclosure. The horizontal axis in FIG. 8 represents time. The electrically floating "F", the scan "G" and the pre-charge "PC" shown in FIG. 8 may refer to the relevant description in FIG. 2 by analogy. The waveform "SYNC", the waveform "scan line period", the waveform "D1_1 to D1_M pre-discharge" and the waveform "D1_1 to D1_M pre-charge" shown in FIG. 8 may refer to the relevant description of the waveform "SYNC", the waveform "scan line period", the waveform "D1_1 to D1_M pre-discharge" and the waveform "D1_1 to D1_M pre-charge" shown in FIG. 2, and the driving time sequence of the scan lines S1_1 to S1_N shown in FIG. 8 may refer to the relevant description of the driving time sequence of the scan lines S1_1 to S1_N shown in FIG. 5, so they are not repeated herein.

The circuit shown in FIG. 6 may run the operation time sequence shown in FIG. 8. In the embodiment shown in FIG. 8, the short-circuit detection period PSD is configured before all scan line periods in a display frame period. The detection operation of the short-circuit detection period PSD shown in FIG. 8 may refer to the related description of the short-circuit detection period PSD shown in FIG. 7, so details are not repeated herein. It is assumed that the scan line S1_2 is connected to a short-circuited LED, while other scan lines (e.g., S1_1 and S1_N) are not connected to any short-circuited LED. After the short-circuit detection period PSD shown in FIG. 8 ends, the scan driver 130 may know from the comparison results Short[1] to Short[n] that the scan line S1_2 is connected to the short-circuited LED. Based on the comparison results Short[1] to Short[n], the scan driver 130 may use the driving time sequence of the scan line S1_2 shown in FIG. 5 to drive the scan line S1_2, and use the driving time sequence of other scan lines (e.g., S1_1 and S1_N) shown in FIG. 5 to drive other scan lines.

To sum up, in any one of the active periods Ts_1 to Ts_N of the scan line periods, the scan driver 130 applies an enable voltage (e.g., the ground voltage or other voltages) to the current scan line among the scan lines S1_1 to S1_N, and the scan driver 130 applies the pre-charging voltage to the first other scan line (the scan line not connected to the short-circuited LED) among the scan lines S1_1 to S1_N. Based on this, the reverse bias voltage difference of the LED circuit connected to the first other scan line may be determined to be within a safe range, so as to avoid damage to the LED circuit connected to the first other scan line. In the case that the LED panel 110 has a short-circuited LED, assuming that the short-circuited LED is connected to the second other scan line, the scan driver 130 may set the second other scan line connected to the short-circuited LED to be electrically floating. Based on this, the driving current of the current scan line may be prevented from being shunted to the second other scan lines. Therefore, the driving device may correctly drive the LED panel 110.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A driving device for a light-emitting diode (LED) panel, comprising:

a source driver, coupled to a plurality of data lines disposed in the LED panel, and configured to output driving currents to the data lines in any one of a plurality of scan line periods, to drive a LED array of the LED panel; and a scan driver coupled to a plurality of scan lines disposed in the LED panel, wherein the scan driver scans the scan lines during the plurality of scan line periods, and in an active period of any one of the scan line periods, the scan driver applies an enable voltage to a current scan line among the scan lines, and the scan driver applies a pre-charge voltage to a first other scan line among the scan lines, wherein an inactive period is configured between active periods of any two adjacent scan line periods among the scan line periods, the source driver pre-discharges the data lines during a first period of the inactive period, and the source driver pre-charges the data lines during a second period of the inactive period, and wherein the second period is later than the first period, wherein the scan driver applies the pre-charge voltage to the scan lines to disable the LED array during the inactive period.

2. The driving device of claim 1, wherein the enable voltage comprises a ground voltage.

3. The driving device of claim 1, wherein the scan driver applies the pre-charge voltage to the scan lines during a short-circuit detection period which is before or after all the plurality of scan line periods in a display frame period, the source driver pre-discharges the data lines during the short detection period, and the scan driver detects the voltage of any one of the scan lines during the short-circuit detection period to determine whether any one of the scan lines is connected to any short-circuited LED.

4. A driving device for a light-emitting diode (LED) panel, comprising:

a source driver, coupled to a plurality of data lines disposed in the LED panel, and configured to output driving currents to the data lines in any one of a plurality of scan line periods, to drive a LED array of the LED panel; and a scan driver coupled to a plurality of scan lines disposed in the LED panel, wherein the scan driver scans the scan lines during the plurality of scan line periods, and in an active period of any one of the scan line periods, the scan driver applies an enable voltage to a current scan line among the scan lines, the scan driver applies a pre-charge voltage to a first other scan line among the scan lines that is not connected to any short-circuited LED, and the scan driver sets a second other scan line connected to a short-circuited LED among the scan lines to be electrically floating.

5. The driving device of claim 4, wherein the enable voltage comprises a ground voltage.

6. The driving device of claim 4, wherein an inactive period is configured between the active periods of any two adjacent scan line periods among the scan line periods, and the scan driver applies the pre-charge voltage to the scan lines to disable the light-emitting diode array during the inactive period.

7. The driving device of claim 6, wherein the source driver pre-discharges the data lines during a first period of the inactive period, and the source driver pre-charges the data lines during a second period of the inactive period.

8. The driving device of claim 4, wherein the scan driver applies the pre-charge voltage to the scan lines during a short-circuit detection period which is before or after all the plurality of scan line periods in a display frame period, the source driver pre-discharges the data lines during the short detection period, and the scan driver detects the voltage of any one of the scan lines during the short-circuit detection period to determine whether any one of the scan lines is connected to any short-circuited LED.

9. The driving device of claim 4, wherein in the active period of any one of the scan line periods, the scan driver applies the enable voltage to the current scan line under the condition that the current scan line does not connects any short-circuited LED.

10. The driving device of claim 4, wherein an inactive period is configured between the active periods of any two adjacent scan line periods among the scan line periods, and the scan driver applies the pre-charge voltage to the second other scan line during the inactive period.

11. A light-emitting diode (LED) panel, comprising:

a LED array;

a plurality of scan line for coupling to a source driver, wherein the source driver outputs driving currents to the data lines in any one of a plurality of scan line periods to drive the LED array; and a plurality of scan lines for coupling to a scan driver, wherein the scan driver scans the scan lines during the plurality of scan line periods, and in an active period of any one of the scan line periods, the scan driver applies an enable voltage to a current scan line among the scan lines, and the scan driver applies a pre-charge voltage to a first other scan line among the scan lines, wherein an inactive period is configured between active periods of any two adjacent scan line periods among the scan line periods, the source driver pre-discharges the data lines during a first period of the inactive period, and the source driver pre-charges the data lines during a second period of the inactive period, and wherein the second period is later than the first period, wherein the scan driver applies the pre-charge voltage to the scan lines to disable the LED array during the inactive period.

12. The LED panel of claim 11, wherein the enable voltage comprises a ground voltage.

13. The LED panel of claim 11, wherein the scan driver applies the pre-charge voltage to the scan lines during a short-circuit detection period which is before or after all the plurality of scan line periods in a display frame period, the source driver pre-discharges the data lines during the short detection period, and the scan driver detects the voltage of any one of the scan lines during the short-circuit detection period to determine whether any one of the scan lines is connected to any short-circuited LED.

14. A light-emitting diode (LED) panel, comprising:

a LED array;

a plurality of data lines for coupling to a source driver, wherein the source driver outputs driving currents to the data lines in any one of a plurality of scan line periods to drive the LED array; and a plurality of scan lines for coupling to a scan driver, wherein the scan driver scans the scan lines during the plurality of scan line periods, and in an active period of any one of the scan line periods, the scan driver applies an enable voltage to a current scan line among the scan lines, the scan driver applies a pre-charge voltage to a first other scan line among the scan lines that is not connected to any short-circuited LED, and the scan driver sets a second other scan line connected to a short-circuited LED among the scan lines to be electrically floating.

15. The LED panel of claim 14, wherein the enable voltage comprises a ground voltage.

16. The LED panel of claim 14, wherein an inactive period is configured between the active periods of any two adjacent scan line periods among the scan line periods, and the scan driver applies the pre-charge voltage to the scan lines to disable the light-emitting diode array during the inactive period.

17. The LED panel of claim 16, wherein the source driver pre-discharges the data lines during a first period of the inactive period, and the source driver pre-charges the data lines during a second period of the inactive period.

18. The LED panel of claim 14, wherein the scan driver applies the pre-charge voltage to the scan lines during a short-circuit detection period which is before or after all the plurality of scan line periods in a display frame period, the source driver pre-discharges the data lines during the short detection period, and the scan driver detects the voltage of any one of the scan lines during the short-circuit detection period to determine whether any one of the scan lines is connected to any short-circuited LED.

19. The LED panel of claim 14, wherein in the active period of any one of the scan line periods, the scan driver applies the enable voltage to the current scan line under the condition that the current scan line does not connects any short-circuited LED.

20. The LED panel of claim 14, wherein an inactive period is configured between the active periods of any two adjacent scan line periods among the scan line periods, and the scan driver applies the pre-charge voltage to the second other scan line during the inactive period.

* * * * *